3,436,206
HALOTYROSINES AS PLANT ROOT
GROWTH STIMULANTS
Shukuo Kinoshita, Tokyo, and Noboru Mukai, Kawasaki-shi, Japan, assignors to Kyowa Hakko Kogyo Co., Ltd., Tokyo, Japan, a corporation of Japan
No Drawing. Filed Oct. 5, 1965, Ser. No. 493,229
Claims priority, application Japan, Oct. 9, 1964, 39/57,298
Int. Cl. A01n 5/00
U.S. Cl. 71—77      13 Claims

ABSTRACT OF THE DISCLOSURE

A method for promoting the growth of plants which comprises treating the plants with a tyrosine derivative having the formula,

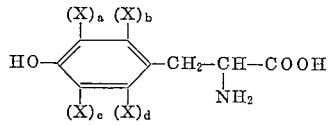

wherein X is halogen and $a$, $b$, $c$ and $d$ are 0 or 1, the sum total of $a$, $b$, $c$ and $d$ being integers from 1 to 4.

---

This invention relates to a method for promoting the growth of plants. More particularly, it relates to a method for promoting the growth of agricultural plants by treatment with certain chemical compounds. Even more particularly, the invention relates to a method for promoting the growth of agricultural plants by treating the same with halogen-substituted tyrosine compounds.

Tyrosine, β-(p-hydroxyphenyl)alanine, is a well known compound. Previously, the present inventors found that 3,5-diiodotyrosine is effective in promoting the growth of agricultural plants (Japanese patent publication No. 7109/65). Further research has shown that halogen derivatives of tyrosine other than 3,5-diiodotyrosine are effective in promoting the growth of agricultural plants.

In accordance with the present invention, it has been found that a method for promoting the growth of agricultural plants advantageously is effected by bringing the agricultural plants in contact with tyrosine derivatives which have one or more of the hydrogen atoms of the phenylene nucleus substituted with halogen atoms. The term "halogen" herein includes iodo, bromo, chloro and fluoro radicals. Hence, compounds such as monoiodotyrosine, diiodotyrosine, monobromotyrosine, dibromotyrosine, monochlorotyrosine, dichlorotyrosine, monofluorotyrosine and difluorotyrosine are included within the scope of the present invention. The tyrosine derivatives of the present invention may be applied either per se or, for example, in a solvent solution thereof, employing any suitable solvent therefor, wherein the tyrosine derivative is the effective component thereof.

Accordingly, one of the objects of the present invention is to provide a method for promoting the growth of plants which overcomes the disadvantages and deficiencies of prior art methods.

Another object of the present invention is to provide a method for promoting the growth of agricultural plants which may be carried out in an efficacious and simple manner.

A further object of the invention is to provide a method for promoting the growth of agricultural plants both in the roots and in the stems and leaves thereof.

A still further object of the present invention is to provide a method for promoting the growth of agricultural plants which increases the sugar content of the roots thereof.

These and other objects of the present invention will become apparent to those skilled in the art from a reading of the present specification and claims.

It has been found that the treatment of agricultural plants with the halogen-substituted tyrosine derivatives of the present invention increases the yield thereof by stimulating the growth of the roots of the plants and by stimulating the movement of sugar. Hence, the method of the present invention exerts a favorable influence particularly upon spreading deep roots. Therefore, the present invention has particular utility with respect to the growth of plants which require transplanting procedures, such as tomato plants, paddy rice, radishes and sweet potato plants.

The following examples are given merely as illustrative of the present invention and are not to be considered as limiting.

EXAMPLE 1

This example illustrates the results obtained when the seeds of radish plants are steeped in a test solution in accordance with the present invention.

Radish seeds (Akamaru species) which have been steeped for 24 hours in aqueous solutions of tyrosine derivatives, as shown below, having molar concentrations ranging from $3 \times 10^{-5}$ to $1 \times 10^{-5}$ and dried in the wind were sowed into unglazed pots having a diameter of 24 cm. The pots were packed with a mixture of 1 kg. of soil, 1 gram of ammonium sulfate, 1 gram of calcium perphosphate and 0.5 gram of potassium sulfate. In the experiment shown as "control" in Table 1 below, water instead of the test solutions was employed. Three seeds were sowed in each pot. Cultivation thereof was effected under glass. Harvesting of the resultant plants was carried out on the 27th day after sowing of the seeds.

The results of this experiment are shown in Table 1. The numerical values therein represent the average values of 12 plants in four pots.

TABLE 1

|  | Molar concentration | Fresh weight of stems and leaves (g.) | Fresh weight of roots (g.) |
|---|---|---|---|
| 3,5-diiodotyrosine | $10^{-5}$ | 3.60 | 4.82 |
| Do | $3\times10^{-5}$ | 4.03 | 4.79 |
| 3,5-dibromotyrosine | $10^{-5}$ | 3.48 | 4.80 |
| Do | $3\times10^{-5}$ | 3.75 | 4.90 |
| Tyrosine | $10^{-5}$ | 3.42 | 4.20 |
| Do | $3\times10^{-5}$ | 3.31 | 4.20 |
| Control |  | 3.36 | 4.15 |

As can be seen from Table 1, tyrosine is not effective in promoting the growth of radish plants while diiodotyrosine and dibromotyrosine are effective in stimulating the growth thereof both above and underneath the ground.

EXAMPLE 2

The stem and leave portions were cut from sweet potatoes (species: Kokei No. 14), which were growing normally on a farm. The cuttings ranged from the top leaves to the fourth or fifth leaves of the plants. These stem and leave portions were then inserted into flasks packed with culture solutions containing certain of the tyrosine derivatives of the present invention. Roots grew out from the stems. After cultivating the plants in a room with artificial light for 10 days, the fresh weight of the grown root portions was determined as well as the total sugar content of the root portions.

The test results thereof are shown in Table 2, wherein the numerical values represent the average values of four plants. Again, the experiment shown as "Control" was carried out by using water instead of the test tyrosine solutions.

TABLE 2

| | Molar concentration | Fresh weight of root (g.) | Total sugar content of root (percent) |
|---|---|---|---|
| Control | | 0.99 | 0.27 |
| Tyrosine | $10^{-5}$ | 1.02 | 0.26 |
| 3-monoiodotyrosine | $10^{-5}$ | 1.40 | 0.36 |
| 3,5-diiodotyrosine | $10^{-5}$ | 1.31 | 0.37 |
| 3,5-dibromotyrosine | $10^{-5}$ | 1.31 | 0.35 |

According to Table 2, it can be seen that the tyrosine derivatives employed are useful for increasing the fresh weight of the root as well as the sugar content of the root.

EXAMPLE 3

This example demonstrates the result obtained when the halogenated tyrosine derivatives of the present invention are scattered on the leaves of sweet potatoes.

Seedlings of sweet potatoes (species: Kintoki) were transplanted into a test frame packed with a mixture of 1 kg. of culturing soil, 1 gram of ammonium sulfate, 1 gram of calcium perphosphate and 0.5 gram of potassium sulfate. On the 41st, 51st and 62nd day after the transplanting, 50 ml. of a solution of various halogenated tyrosine derivatives, as shown below, was scattered on the leaves of the sweet potato plants. These solutions contained the tyrosine derivatives in a concentration of 10 p.p.m. Harvesting was carried out on the 115th day after transplanting.

The fresh weight of sweet potato harvested is shown in Table 3, wherein the numerical values represent the average values of four divisions of plants. The experiment shown as "Control" was carried out with the use of water on the leaves instead of the test tyrosine solution.

Table 3

| | Average fresh weight of sweet potato (kg.) |
|---|---|
| Control | 0.77 |
| 3,5-diiodotyrosine (aqueous solution) | 0.99 |
| 3,5-dibromotyrosine (aqueous solution) | 0.93 |

The application of the halogenated tyrosine derivatives of the present invention to agricultural plants is carried out in accordance with conventional procedures. Thus, the method and concentration used and/or the form of the treating substance will vary with the type of plant and with the desires of the user. By using auxiliary agents, the halogenated tyrosine derivatives can be made into a liquid (for example, an aqueous solution), powder, solid, hydrated, etc. form as desired. Any diluents, solidifying agents such as talc, diatomite, starch and gypsum, and surfactants may be used for improving extendability, emulsification, and distribution. Such forms of agricultural treating compounds are conventional in the art.

When the treating solution is used on a plant, for example, a seed, a radicle, a seed taro or a bulb may be steeped or soaked in the treating solution or the treating solution may be scattered on a seedling, a flower, a young fruit, a stem or a leaf thereof. The preferable carrier is water. Although the concentration of tyrosine derivative used varies according to the method employed, the kind of plants, the length of treatment etc., generally it is not used in contact with the plant in a concentration of greater than 50 p.p.m. when the tyrosine derivative is used in the liquid form.

Although certain halogenated tyrosine derivatives have been specifically illustrated in the examples herein, it is to be understood that the present invention in its broadest aspect encompasses tyrosine derivatives having the general formula,

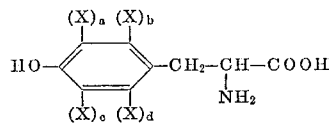

wherein X is halogen and $a$, $b$, $c$, and $d$ are 0 or 1, the sum total of $a$, $b$, $c$ and $d$ ranging from 1 to 4, as the treating agent for plants.

The invention being thus described, it will be obvious that the same may be varied in many ways. Such variations are not to be regarded as a departure from the spirit and scope of the invention and all such modifications are intended to be included within the scope of the following claims.

What we claim is:

1. A method for promoting the growth of the roots of agriculture plants which comprises treating said plants with an effective growth-promoting amount of a tyrosine derivative having the general formula,

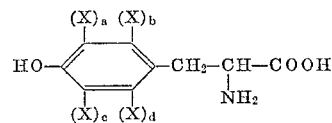

wherein X is halogen and $a$, $b$, $c$ and $d$ are 0 or 1, the sum total of $a$, $b$, $c$ and $d$ being 1 or 2.

2. The method of claim 1, wherein said tyrosine derivative is monoiodotyrosine.

3. The method of claim 1, wherein said tyrosine derivative is diiodotyrosine.

4. The method of claim 1, wherein said tyrosine derivative is monobromotyrosine.

5. The method of claim 1, wherein said tyrosine derivative is dibromotyrosine.

6. The method of claim 1, wherein said tyrosine derivative is monochlorotyrosine.

7. The method of claim 1, wherein said tyrosine derivative is dichlorotyrosine.

8. The method of claim 1, wherein said tyrosine derivative is monofluorotyrosine.

9. The method of claim 1, wherein said tyrosine derivative is difluorotyrosine.

10. A method for promoting the growth of the roots of agriculture plants which comprises treating said plants with a solvent solution containing at least an effective growth promoting amount and up to 50 p.p.m. of a tyrosine derivative having the general formula,

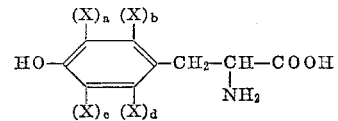

wherein X is halogen and $a$, $b$, $c$ and $d$ are 0 or 1, the sum total of $a$, $b$, $c$ and $d$ being 1 or 2.

11. The method of claim 10, wherein said tyrosine derivative is diiodotyrosine.

12. The method of claim 10, wherein said tyrosine derivative is dibromotyrosine.

13. The method of claim 10, wherein said tyrosine derivative is dichlorotyrosine.

References Cited

FOREIGN PATENTS 485,079   5/1938   Great Britain.

OTHER REFERENCES

RAM, "Detection of Growth Factors in Culture Filtrates of Fusaria" (1956) CA 51 p. 5922 (1957).

VLASYUK, "Chemical Stimulation, etc.": (1933) CA 27 p. 5873 (1933).

WEST et al., "Textbook of Biochemistry," pp. 269–270 3rd ed. (1964).

MUKAI et al., "Stimulative Effect of Halogenated Tyrosine on Root Growth of Rice Seedlings," June (1965), CA 63 (1965) p. 18951.

CORTNER et al., "The Hormones of The Thyroid Gland" (1949), Outlines of Biochemistry 3rd ed. (1949), p. 954, QP514 G65.

LEWIS GOTTS, *Primary Examiner.*

G. HOLLRAH, *Assistant Examiner.*

U.S. Cl. X.R.

71—115